United States Patent
Micka (10) Patent No.: US 6,490,596 B1
(45) Date of Patent: Dec. 3, 2002

(54) METHOD OF TRANSMITTING STREAMLINED DATA UPDATES BY SELECTIVELY OMITTING UNCHANGED DATA PARTS

(75) Inventor: William Frank Micka, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/436,871

(22) Filed: Nov. 9, 1999

(51) Int. Cl.⁷ .............................................. G06F 12/00
(52) U.S. Cl. ........................ 707/203; 707/101; 709/201
(58) Field of Search ............................... 707/1–3, 8–10, 707/100–104.1, 200–206; 709/201, 315, 200; 711/162, 165; 717/3, 11

(56) References Cited

U.S. PATENT DOCUMENTS

| | | | |
|---|---|---|---|
| 4,912,637 A | * 3/1990 | Sheedy et al. | 364/300 |
| 5,210,866 A | 5/1993 | Milligan et al. | 395/575 |
| 5,239,637 A | 8/1993 | Davis et al. | 395/425 |
| 5,559,991 A | 9/1996 | Kanfi | 395/489 |
| 5,588,075 A | * 12/1996 | Chiba et al. | 382/239 |
| 5,634,052 A | 5/1997 | Morris | 395/601 |
| 5,758,358 A | * 5/1998 | Ebbo | 707/203 |
| 5,765,173 A | 6/1998 | Cane et al. | 707/204 |
| 5,787,485 A | * 7/1998 | Fitzgerald et al. | 711/162 |
| 5,794,254 A | 8/1998 | McClain | 707/204 |
| 6,012,057 A | * 1/2000 | Mayer et al. | 707/6 |
| 6,131,088 A | * 10/2000 | Hill | 705/25 |
| 6,219,818 B1 | * 4/2001 | Freivald et al. | 714/799 |

FOREIGN PATENT DOCUMENTS

DE 19821819 * 12/1998

* cited by examiner

Primary Examiner—John Breene
Assistant Examiner—Harold E. Dodds, Jr.
(74) Attorney, Agent, or Firm—Dan Hubert & Assoc.

(57) ABSTRACT

In an expeditious approach to transmitting updated data objects from one computing site to another, a transmitting site compares an updated data object with its previous version, and only includes the changed subparts in its transmission to the receiving site. The data object is therefore sent in a compacted state. The transmitting site also sends a map showing the changed subparts's relative positions within the entire data object. The receiving site retrieves a locally stored previous version of the data object, and combines the data object's unchanged subparts with the changed subparts recently sent by the transmitting site.

23 Claims, 5 Drawing Sheets

METHOD OF TRANSMITTING STREAMLINED DATA UPDATES BY SELECTIVELY OMITTING UNCHANGED DATA PARTS

BACKGROUND OF THE INVENTION

1. Field of the Invention

The present invention relates to the expedited transmission of machine-readable data from one site to another. More particularly, the invention concerns a method and apparatus that expeditiously transmits an updated data object from one site to another by comparing the updated data object to its previous version at the first site, sending the updated data object to the second site minus any unchanged parts, and then reconstructing the updated data object at the second site using a locally stored copy of the data's previous version.

2. Description of the Related Art

In today's information age, people are always seeking faster ways of exchanging data. One technique is to use faster communications media, such as substituting a T1 line for a residential telephone line, for example. Another technique compresses the data before transmission, and thereby completes the data transfer more quickly by sending a smaller package of data. In any case, the exchange of data always incurs some expense, and people always welcome new ways to transfer data quickly and thereby save money.

The remote copy environment is one area in which data transfer problems are especially acute. A direct access storage device ("DASD") remote copy pair includes primary and secondary storage sites. The primary storage site receives user data from a host and stores that data utilizing DASD media such as magnetic disk drives. The primary site routinely forwards new data to the secondary site, enabling the secondary site to maintain a mirrored copy of the primary site's contents. In this way, the secondary site may be easily substituted for the first site if the primary site fails. Data transfer is central to the remote copy environment because the primary site's entire function is to receive and store data, and all of this data must be somehow "mirrored" to the secondary site. This is complicated by the fact that the amount of data transfer is often substantial, and the remote copy pairs are often separated geographically. With geographical separation, expensive transmission lines must be used to transfer data, and the transfer cost is relative to the number of transmission lines and their bandwidth.

Even though significant advances have been made in data transfer technology, IBM engineers are continually striving to reduce costs by further improving data transfer speed. In certain cost-critical or time-critical applications, known data transfer approaches may not be completely satisfactory.

SUMMARY OF THE INVENTION

Broadly, the present invention concerns a more expeditious approach to transmitting updated data objects from one site to another. Namely, a transmitting site compares the updated data object with its previous version, and only includes the changed subparts in its transmission to the receiving site. The data object is therefore sent in a compacted state, constituting a compacted data object. The transmitting site also sends a map showing the changed subparts' relative positions within the entire data object. The receiving site retrieves a locally stored previous version of the data object, and combines the data object's unchanged subparts (stored locally) with the changed subparts (recently sent by the transmitting site).

In one embodiment, the transmitting site makes a queue entry for each updated data object that is received. Then, the site compares the new and existing data objects and incrementally prepares the compacted data object and map. A data transmission routine serially processes the queue by transmitting, each item represented by a queue entry. If a data objects queue entry percolates to the top of the queue before the compacted data object is completed, the partially complete map and compacted data object are sent anyway, still achieving some savings in transmission speed. In this case, the data object's brief wait time in the queue indicates that there is no backlog of data objects for transmission, and efficiency does not suffer.

In one embodiment, the invention may be implemented to provide a method to expeditiously transmit data updates by selectively omitting unchanged data parts and identifying their relative positions within the data updates. In another embodiment, the invention may be implemented to provide an apparatus, such as a computing site, programmed to expeditiously send and/or receive data updates by selectively omitting unchanged data parts and identifying their relative positions within the data updates. In still another embodiment, the invention may be implemented to provide a signal-bearing medium tangibly embodying a program of machine-readable instructions executable by a digital data processing apparatus to perform operations as described above. Another embodiment concerns logic circuitry having multiple interconnected electrically conductive elements configured to perform operations as described above.

The invention affords its users with a number of distinct advantages. Chiefly, the invention abbreviates data updates for faster transmission between computing sites. Instead of assuming that the entire data object has changed as with prior approaches, the present invention compares new and existing data objects to find the changed subparts of the new data object, and restricts data transmission to those changed subparts. With less data to send, the overall transmission occupies less time, freeing valuable input/output components to perform other tasks. Also, when the computing sites are remotely located, the reduced data transmission time saves money required to rent long distance communication lines, such as T1 lines, etc. Moreover, in contrast to prior approaches that use computation-intensive data compression algorithms, the invention achieves low processing overhead by completely omitting large blocks of data from transmission, based on results of a relatively fast data comparison. Advantageously, this invention may incoporate data compression algorithms as well, further conserving transmission bandwidth. Although the content of the transmitted data is different with this invention, overhead is still low because this type data can be sent using existing code. Furthermore, the invention is compatible with mirroring storage systems that communicate directly (i.e., peer-to-peer remote copy or "PPRC" systems), as well as systems that utilize a data mover to transmit data from one site to another (i.e., extended remote copy or "XRC" systems). Additionally, the invention works with both open and count key data ("CKD") systems. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Overall Data Storage and Exchange System

One aspect of the invention concerns a data storage and exchange system, which may be implemented with a variety of different hardware. This invention may be utilized to exchange machine-readable data from one machine to another, where each machine includes a processing component, data storage, and an input/output ("I/O") element. Although these two machines may be closely connected by hardwiring, backplane, common hardware, and the like, the invention offers particular benefits for machines that are remotely located over substantial distances. Moreover, although the invention is not limited to storage applications, it may be especially useful when implemented in sister storage sites that conduct PPRC or XRC data mirroring. An example of one such a storage site is the IBM model 2105 product.

Figure 1:
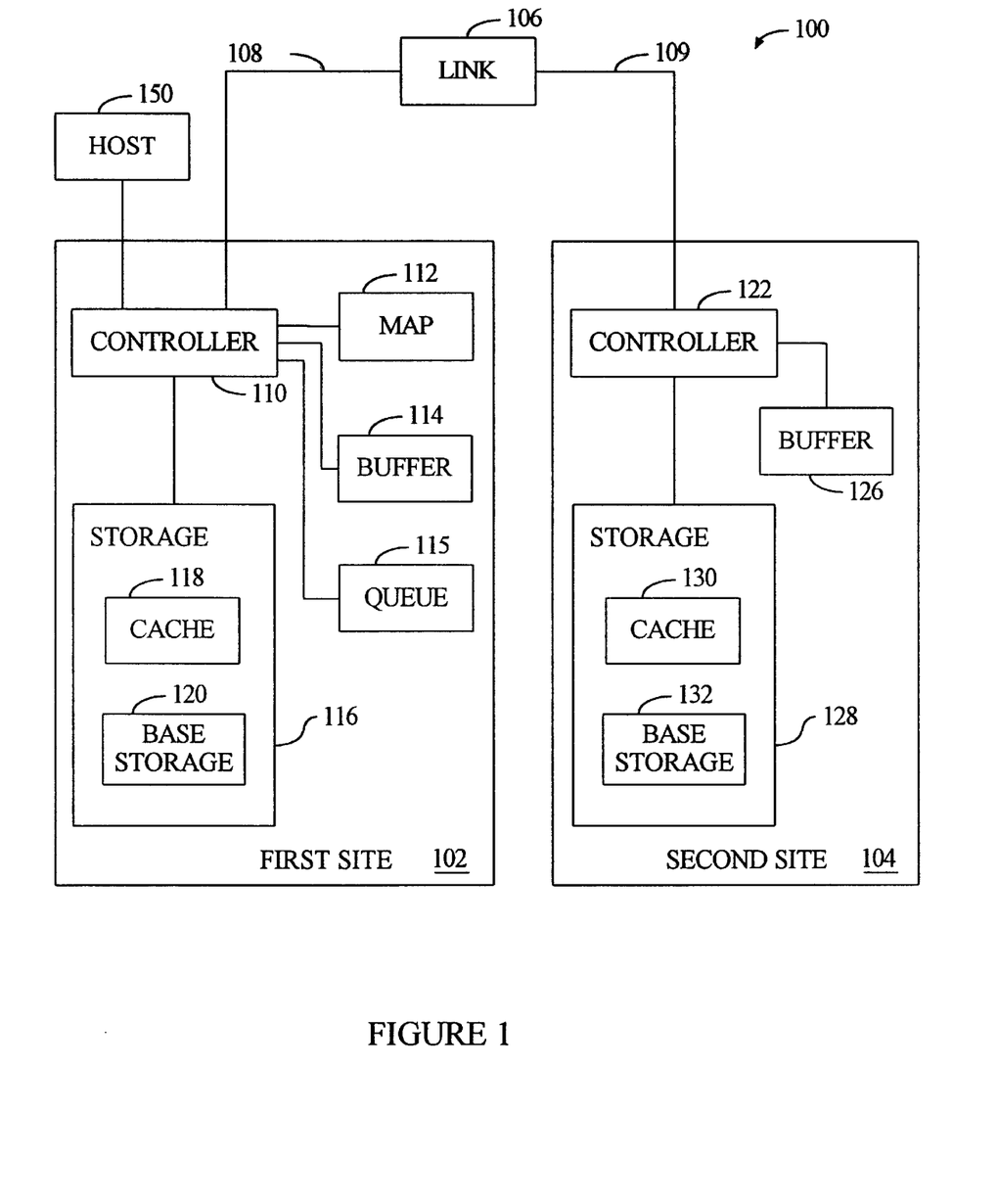
FIG. 1 is a block diagram of the hardware components and interconnections of a data storage and exchange system, according to the invention.

FIG. 1 shows one example of a data storage and exchange system 100, with a particular illustration of the related hardware components and interconnections. The system 100 includes first and second sites 102, 104 connected by a link 106. The first site 102 is additionally coupled to a host 150, which comprises another computer, an interface to a human operator, etc. The first site 102 includes a controller 110 coupled to a data storage 116, map 112, buffer 114, and queue 115. The storage 116 includes cache 118 and base storage 120. The second site 104 includes a controller 122 coupled to a buffer 126 and also a data storage 128 containing cache 130 and base storage 132. The sites 102, 104 include respective I/Os 108, 109 to exchange communications via the link 106.

The components of FIG. 1 will now be addressed more specifically. Although the components of the first and second sites 102, 104 may be different if desired, the first site 102 is discussed as being representative of the second site 104, insofar as similar components are depicted. The controller 110 comprises a data processing device that is programmed or otherwise configured to manage the first site 102. Examples of the controller 110 include logic circuitry, discrete circuit elements, microprocessors or other computers that process machine-readable instructions, etc. As a specific example, the controller 110 may comprise an IBM model RS/6000 processor.

The requirements of the storage 116 may be satisfied by any facility that stores machine-readable digital data with sufficient speed and reliability for the particular operations discussed in detail below. Some examples include magnetic hard drives, circuit memory, magnetic tape, etc. As illustrated, the storage 116 includes an economical base storage 120 and a more expensive, fast access cache 118. For the present illustration, the base storage 120 comprises one or more magnetic disk storage devices, and the cache 118 comprises random access memory ("RAM").

In addition to the storage 116, a map 112, buffer 114, and queue 115 are coupled to the controller 110. Although shown separately, these components may be incorporated into the storage 116, placed on-board the controller 110, located off-site, or situated in another location, despite the particular arrangement shown in FIG. 1. As explained below in greater detail, the illustrated embodiment of map 112 comprises one or more changeable bit maps. The buffer 114 comprises a digital memory location of sufficient size to construct a compacted data object for transmission to the second site 104, as discussed in greater detail below. The queue 115, an optional component, maintains a list of data objects awaiting transmission to the second site 104. As discussed below, the controller 110 sequentially processes queued data objects for transmission to the second site 104.

The first site 102 includes an I/O 108 to communicate with the second site 104. The I/O 108 may comprise a port, pin connection, connector, modem, antenna, or another means to transmit and receive data. The I/Os 108,110 are interconnected by a link 106. The link 106 may comprise a passive device such as one or more wires, fiber optic lines, busses, telephone lines, wireless links, etc. As one example, a passive link may be useful when the sites 102, 104 are operated as a mirrored storage pair, in a peer-to-peer remote copy environment. In another embodiment, the link 106 comprises an active device such as an ESCON connection or other intelligent communications channel, etc. An active link may be useful, for example, when the sites 102, 104 are operated as a mirrored storage pair in an XRC environment, where the link 106 constitutes a data mover machine that transfers data between the sites 102, 104.

Exemplary Digital Data Processing Apparatus

Figure 2:
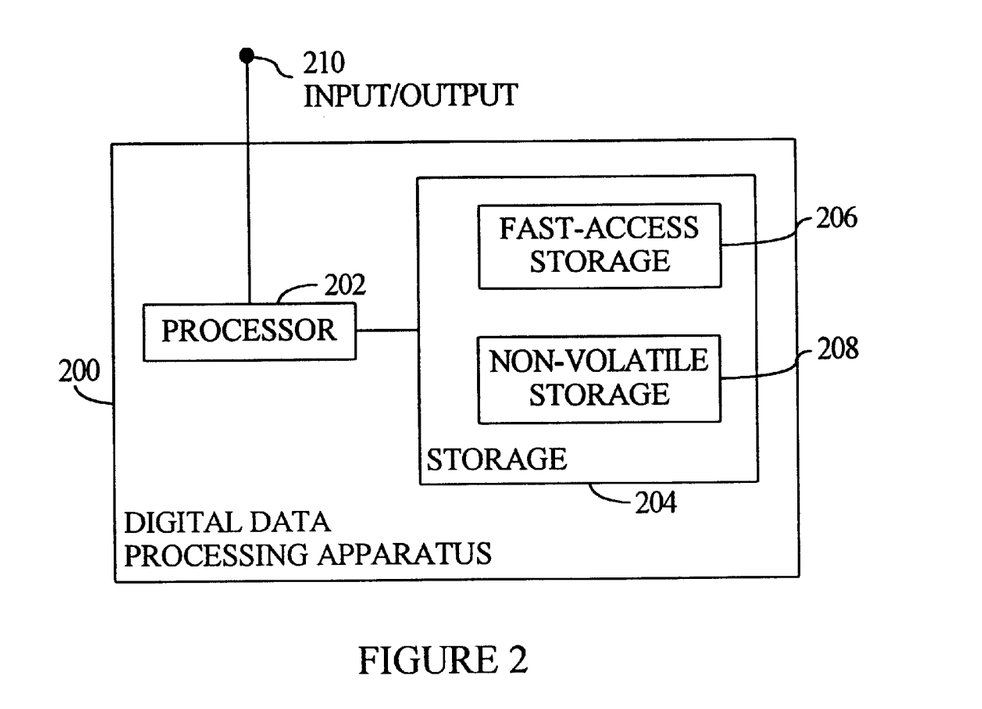
FIG. 2 is a block diagram of a digital data processing machine according to the invention.

Another aspect of the invention concerns a digital data processing apparatus, which may be used to implement one or both controllers 110, 122. This apparatus may be embodied by various hardware components and interconnections; one example is the digital data processing apparatus 200 of FIG. 2. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise RAM, and may be used to store the programming instructions executed by the processor 202. The nonvolatile storage 208 may comprise, for example, one or more magnetic data storage disks such as a "hard drive," a tape drive, or any other suitable storage device. The apparatus 200 also includes an I/O 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, a different embodiment of the invention uses logic circuitry instead of computer-executed instructions. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

In addition to the various hardware embodiments described above, a different aspect of the invention concerns a method for expeditiously transmitting an updated data object from one computing site to another by comparing the updated data object to its previous version, and selectively omitting the unchanged parts from the transmission.

Signal-Bearing Media in the context of FIG. 1, such a method may be implemented by operating the controllers 110, 122, each as embodied by a digital data processing apparatus 200, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to expeditiously transmit an updated data object from one computing site to another by comparing the updated data object to its previous version, and selectively omitting the unchanged parts from the transmission. Another aspect of the invention is a signal bearing medium programmed to perform a method to receive such a compacted data object and reconstruct the entire updated data object.

Figure 3:
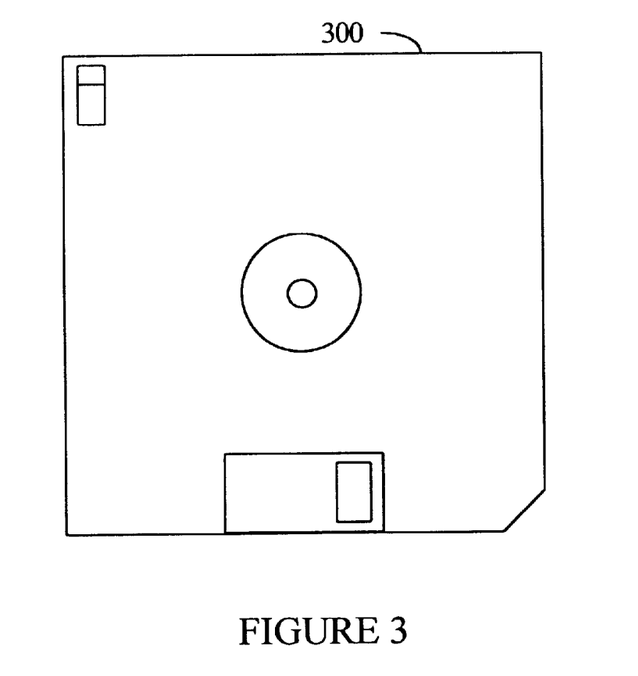
FIG. 3 shows an exemplary signal-bearing medium according to the invention.

This signal-bearing media may comprise, for example, RAM (not shown) contained within the controller 110, as represented by the fast-access storage 206. Alternatively, the instructions may be contained in another signal-bearing media, such as a magnetic data storage diskette 300 (FIG. 3), directly or indirectly accessible by the processor 200. Whether contained in the storage 206, diskette 300, or elsewhere, the instructions may be stored on a variety of machine-readable data storage media, such as direct access storage (e. g., a conventional "hard drive," redundant array of inexpensive disks ("RAID", or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, the method aspect of the invention may be implemented using logic circuitry, without using a processor to execute instructions. In this embodiment, the logic circuitry is implemented in the controllers 110, 122, and is configured to perform operations to implement the method of the invention. The logic circuitry may be implemented using many different types of circuitry, as discussed above.

Transmit Processing

Figure 4:
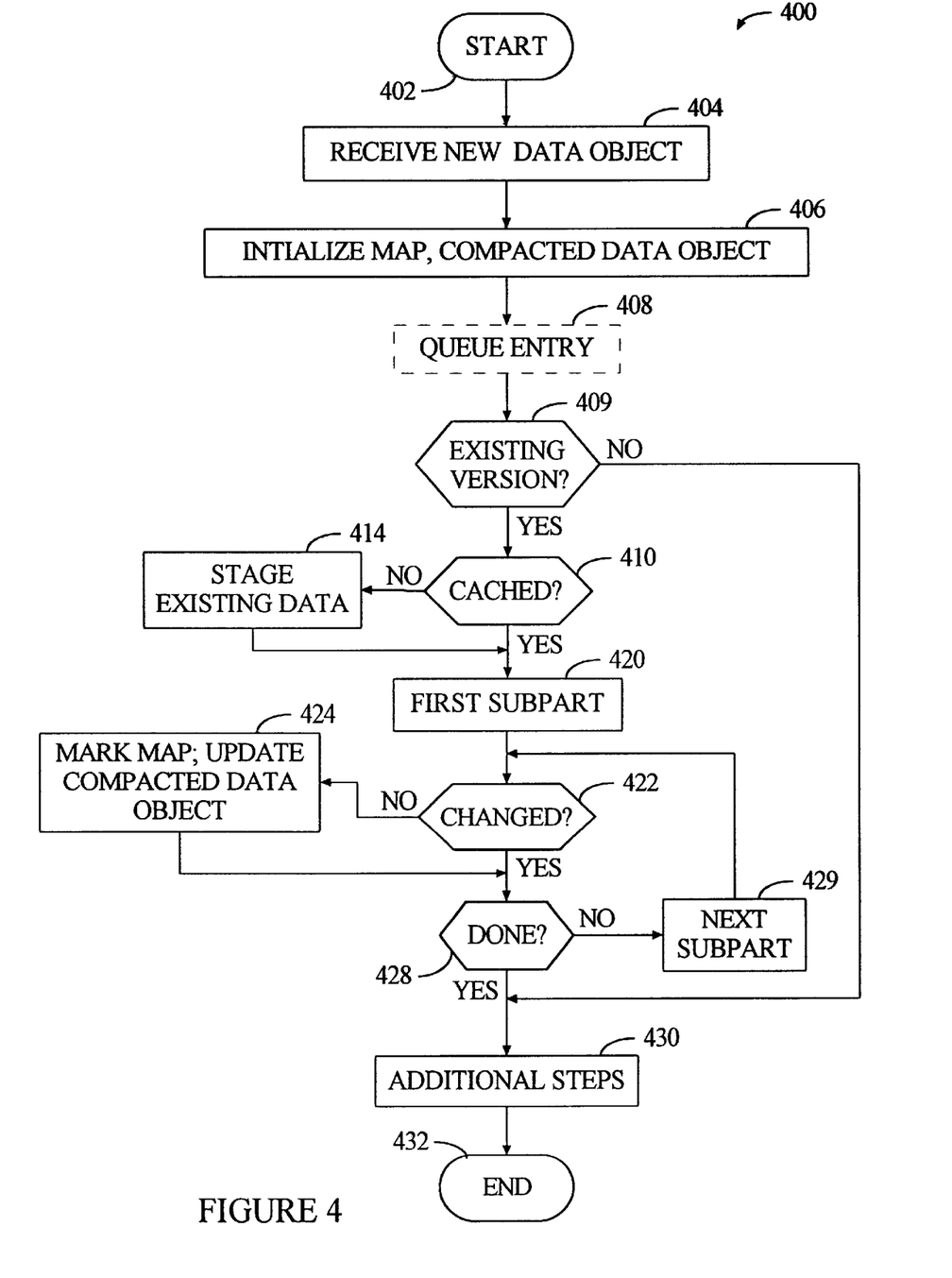
FIG. 4 is a flowchart showing a sequence for preparing compacted data objects and maps for transmission according to the invention.

FIG. 4 shows a sequence 400 for processing data for transmission from one computing site to another. For ease of explanation, but without any intended limitation, the example of FIG. 4 is described in the context of the system 100 described above, and specifically describes a technique for sending data from the first site 102 to the second site 104. The sequence 400 begins in step 402. In step 404, the controller 110 receives a "new data object" from the host 150. Alternatively, the controller 110 in step 404 may receive host notification of off-site data awaiting storage. In this case, the controller 110 receives the data at an appropriate time, which may occur concurrently with other processing steps 400.

After step 404, the controller 110 initializes contents of the map 112, and also initializes a "compacted" data object (step 406). In the present example, the map 112 comprises a binary bit map, although the same utility may be achieved with a list, text, string, alphanumeric code, or other configuration nonetheless embodying a "map" according to this invention. The bit map 112 of this example contains one hundred twelve bits, for the following reasons. The sites 102, 104 exchange data in units based upon a fundamental "data object." As an example, the data object may be the smallest unit of data that the site 102 can write and read in response to requests from the host 150. Depending upon the particular application, data objects may comprise tracks, logical cylinders, surfaces, platters, files, records, physical volumes, logical volumes, pages, bytes, or another convenient unit of data. In the present example, utilizing magnetic disk storage to implement the base storage 120, each data object is one magnetic disk "track." Each data object includes an equal number of data subcomponents, called "subparts." For example, each track includes one hundred twelve sectors, each sector including five hundred twelve bytes. Thus, the bit map 112 initialized in step 406 contains one hundred twelve bits representing the new data object. Since the data object comprises one track, each bit represents one sector of the new data object. For ease of implementation, the first bit in the bit map 112 may represent the first sector in the data object, and so on. In order to initialize the bit map 112, the controller 110 sets all bits to binary "one." This signifies that all sectors in the new data object are changed with respect to the existing data object, and will result in the entire data object being sent to the second site 104.

As mentioned above, step 406 also initiates a "compacted" data object. Ultimately, the routine 400 seeks to reduce the compacted data object to those subparts of the new data object that have changed with respect to the existing data object. The compacted data object is initialized by storing the entire new data object in the buffer 114, complying with the initial assumption that all subparts have changed.

After step 406, the controller 110 performs an optional "early queue step" 408. In this step, the controller 110 makes an entry in the queue 115 corresponding to the new data object (step 408). This entry may comprise a pointer to the data object, volume serial number, address of the data object in the storage 116, or another appropriate identifier. As explained below, the controller 110 incrementally processes entries in the queue 115 for transmission of each represented data object to the second site 104.

After step 408, the controller 110 determines whether the storage 116 contains an existing version of the new data object (step 409). This operation may be performed, for example, by the controller reviewing appropriate base storage and cache directories. If there is no existing version of the new data object, step 409 jumps to step 430, which is discussed below. If there is an existing version of the data object, however, step 409 proceeds to step 410, where the controller determines whether the existing data object is cached. If not, the controller 110 stages the existing data object from the base storage 120 into the cache 118 (step 414) in order to speed the subsequent data comparison, described below.

After step 414, or an affirmative answer to step 510, the controller 110 starts its comparison of the new and existing data objects by selecting a first subpart of the new/existing data objects (step 420). In step 422, the controller 110 analyzes the first subpart of the new data object (present in the buffer 114) to determine whether it has changed relative to the same subpart of the existing data object (present in the cache 118). As an example, step 422 may be performed by performing an exclusive-OR operation ("XOR") upon the bits of the new and existing subparts. If the new data object's subpart is changed relative to the same subpart in the existing data object, the XOR results in a binary "one"; in this case, the routine 400 leaves the bit map 112 untouched so that the corresponding bit remains as a binary "one" (as initialized in step 406). On the other hand, if the current subpart does not show a change, the result of the XOR is zero. In this case, the controller 110 zeros the corresponding bit from the bit map 112, indicating "no change"(step 424). Also in step 424, the controller 110 removes the unchanged subpart from the compacted data object, since the second site 104 can independently obtain this subpart from the copy of the existing data object locally stored at the second site 104. The unchanged subpart may be removed (step 424) by deletion, marking this data in some way, writing over the data, or another technique. The compacted data object may be implemented by a file containing the changed subparts, linked list, a concatenation of the subparts, pointers to relevant subparts in the buffer 114, etc.

After step 424, or an affirmative answer to step 422, the controller 110 asks whether all subparts have been compared (step 428). If not, step 429 progresses to the next subpart, and returns to step 422 for analysis of that subpart. When all subparts of the new and existing data objects have been examined, the bit map 112 and compacted data object are complete. TABLE 1, below, illustrates a sample bit map and the contents of a corresponding compacted data object upon completion of step 428. In this example, the second, third, and sixth subparts are changed.

TABLE 1

| BIT MAP | 0110 0100 . . . (112 bits total) |
|---|---|
| COMPACTED DATA OBJECT | 2nd sector/3rd sector/6thsector . . . |

With the bit map 112 and compacted data object complete, step 428 advances to step 430, which may perform various optional tasks. For example, step 430 may compress the compacted data object by applying one or more data compression algorithms. Also, if the early queue step 408 is omitted, step 430 enters the current data object in the queue 115. After any additional steps are performed in step 430, the routine 400 ends in step 432.

Transmit Queue

Figure 5:
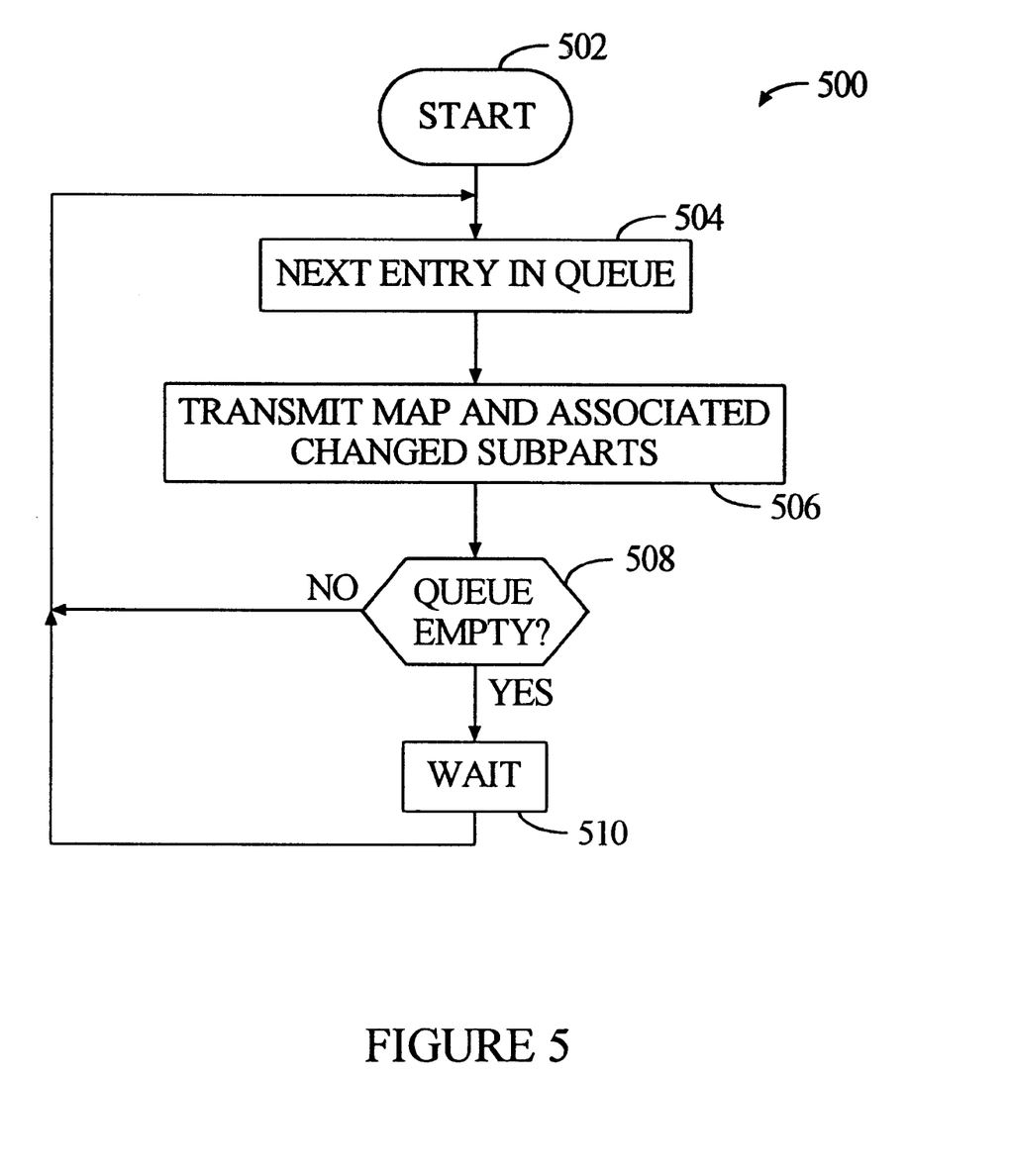
FIG. 5 is a flowchart showing a sequence for transmitting enqueued compacted data according to the invention.

FIG. 5 shows a sequence 500 in which the controller 110 obtains data processed according to the sequence 400 (FIG. 4) and transmits this data to the second site 104. For ease of explanation, but without any intended limitation, the example of FIG. 5 is described in the context of the system 100 described above. The sequence 500 begins in step 502.

In step 504, the controller 110 advances to the next entry in the queue 115, making this entry the "current" entry. The controller 110 may advance through the queue 115 in a first-in-first-out basis, as one example. In the present example, the current queue entry contains a pointer identifying the corresponding compacted data object stored in the buffer 114. In step 506, the controller 110 utilizes the current queue entry to find the compacted data object in the buffer 114, and transmits the compacted data object and its associated bit map 112 to the second site 104.

In embodiments that utilize the early queue step 408, step 506 may occur before steps 409-430 have an opportunity to process all subparts of the new and existing data objects, and thus completely form the compacted data object. This is possible when conditions favor especially fast data transmission speed. In this case, the compacted data object is nonetheless ready for transmission because the bit map 112 and compacted data object are initialized (step 406, FIG. 4) such that the entire new data object will be sent. If one or more unchanged subparts have been located (step 424, FIG. 4), the bit map 112 and compacted data object will have been updated accordingly. Therefore, step 506 transmits the compacted data object and associated bit map 112 according to the current state of completion of the routine 400, which might have finished, or not. If step 506 occurs before the new and existing data objects have been completely analyzed, the rate of data transfer in the system 100 does not suffer. Indeed the data transmission rate between sites 102, 104 is apparently quite fast in this case, as evidenced by the brisk advancement of the queue before completion of the sequence 400. In case step 506 has occurred before steps 409–430 have finished analyzing all subparts of the current data object, the routine 500 may issue a hardware interrupt or other appropriate signal to cause the routine 400 to abort further processing of this data object.

Following step 506, the controller 110 determines whether the queue 115 is now empty (step 508). If not, the controller 110 advances to the next queued entry in step 504. When the queue 115 is empty, the controller 110 enters a wait state 510 insofar as the sequence 500 is concerned.

Receive Processing

Figure 6:
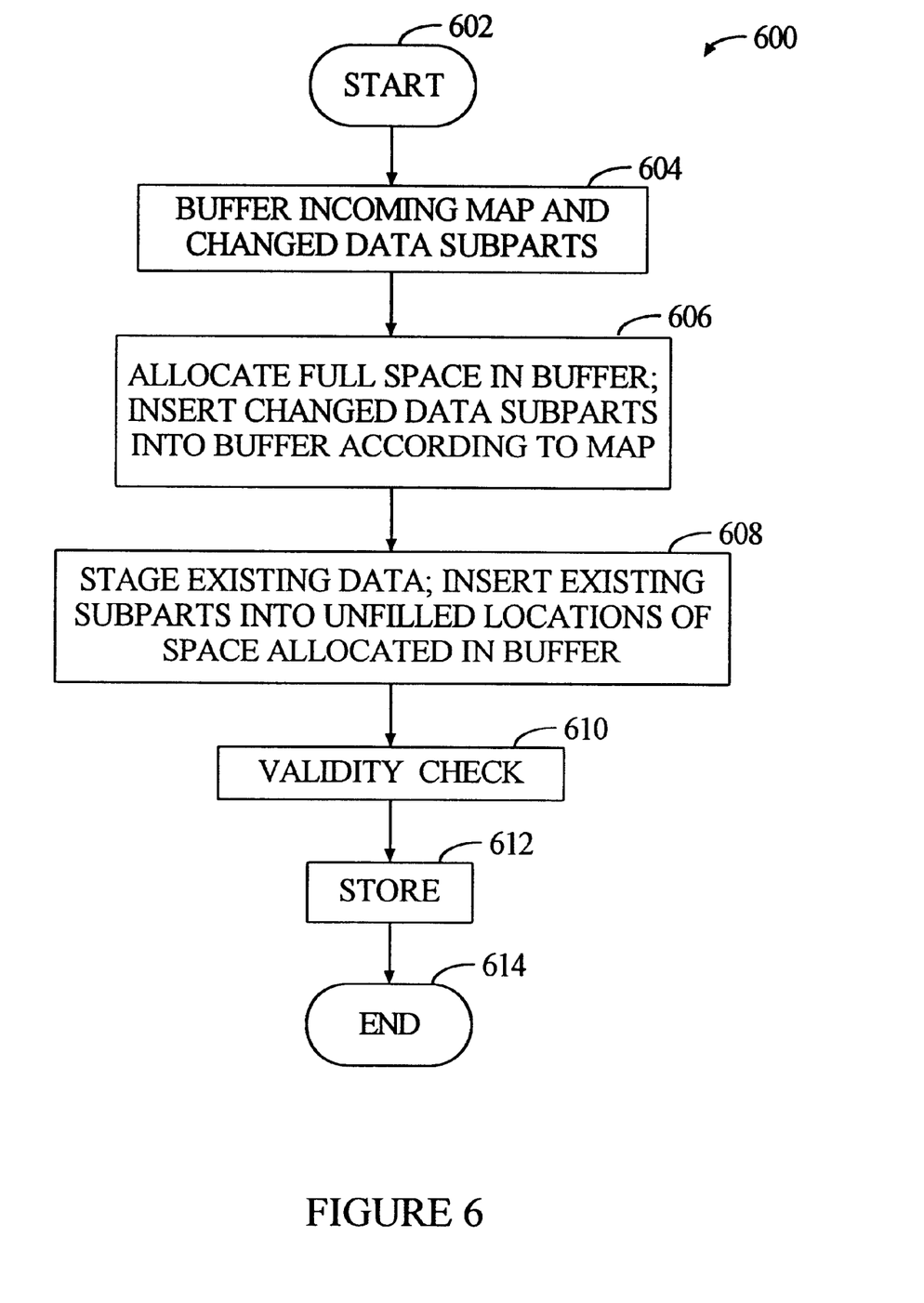
FIG. 6 is a flowchart showing a sequence for reconstituting compacted data received from a transmitting site according to the invention.

FIG. 6 shows a sequence 600 in which the controller 122 of the second site 104 receives, reconstructs, and stores the new data object transmitted from the first site 102. For ease of explanation, but without any intended limitation, the example of FIG. 6 is described in the context of the system 100 described above. The sequence 600 begins in step 602. In step 604, the controller 122 receives the compacted data object and bit map, which the first site's controller 110 transmitted in step 506 (FIG. 5). As an example, the controller 122 may receive this incoming data into the buffer 126.

Next, the controller 122 begins the process of reconstructing the new data object in the buffer 126. First, in step 606, the controller 112 allocates sufficient space in the buffer 126 to store a full data object, e.g. one hundred twelve sectors. Then, the controller 122 inserts the changed data subparts (from the compacted data object) into the appropriate sectors of the allocated space, utilizing the newly received bit map as a placement guide. In particular, the relative positions of the bit map's binary "ones" show where the changed data objects reside in the data object. For example, in the example of TABLE 1, the bit map indicates that sectors two, three, and six have been changed. Accordingly, the controller 112 inserts the compacted data object's first subpart into sector two of the allocated space, and then inserts the third subpart into sector three of the allocated space, inserts the third subpart into sector six, and so on.

Next, the controller 122 stages the existing data object from its own storage 128 into the appropriate locations of the new data object under construction in the buffer 126 (step 608). If the compacted data object contains all sectors of the new data object, then the new data object is completely changed, and this step is omitted. Otherwise, the controller 122 completes the process of reconstructing the new data object by utilizing the bit map as a guide to pick out the unchanged data subparts from the locally stored, existing data object and store the unchanged data subparts in the allocated buffer space. Specifically, the relative positions of the bit map's zeros show where the unchanged data subparts reside in the data object.

After step 608, the new data object has been reconstructed in the buffer 126. The controller 112 then performs a validity check, using an appropriate software checking algorithm such as cyclical redundancy ("CRC"), logical redundancy ("LRC"), etc. If the last sector of each track is allocated for storage of a validity code (such as LRC or CRC), the controller 122 can always anticipate a change to the last sector if any other subparts have been changed. After the validity check, and assuming that the check passes, the controller 112 copies the reconstructed data object from the buffer 126 into the storage 128. Then, the program 600 ends in step 614.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond specific order.

What is claimed is:

1. A method of transmitting data from a first computing site to second computing site, comprising the operations of:

at the first computing site, receiving a new data object comprising a new version of an existing data object already stored at the first computing site, the new and existing data objects each containing multiple subparts;

the first computing site comparing the new data object with the existing data object to identify any changed subparts of the new data object with respect to corresponding subparts of the existing data object, the first computing site preparing a map indicating positions of the changed subparts within the new data object;

the first computing site preparing an abbreviated data object that includes the changed subparts and omits any unchanged subparts; and the first computing site transmitting the map and the abbreviated data object to the second computing site.

2. The method of claim 1, the operations further comprising:

the second computing site receiving the map and the abbreviated data object, where the secondary computing site already contains a local copy of the existing data object;

the second computing site reconstructing the new data object by obtaining the changed subparts of the new data object from the abbreviated data object, obtaining unchanged subparts of the new data object from the local copy, and combining the obtained subparts.

3. The method of claim 1, where the map is a bit map including bits equal in number to the prescribed number.

4. The method of claim 1, the operations further comprising applying a compression process to the abbreviated data object prior to the transmitting operation.

5. A method of transmitting data from a first storage facility to a second storage facility, comprising the operations of:

at the first storage facility, receiving a new data object comprising a new version of an existing data object already stored at the first storage facility, each data object containing multiple subparts;

initializing a map to indicate all subparts within the new data object as being different than corresponding subparts of the existing data object;

analyzing the new data object, comprising operations of:
comparing a subpart of the new data object to a corresponding subpart of the existing data object to determine whether the subparts differ, and only if the subparts do not differ, updating the map to indicate the subpart as being unchanged from the corresponding subpart of the existing data object;
repeating the comparing step for each subpart of the new data object;

preparing an abbreviated data object that includes the different subparts of the new data object while omitting subparts that do not differ as between the new and existing data objects; and transmitting the map and the abbreviated data object from the first storage facility to the second storage facility.

6. The method of claim 5, where the operations of preparing an abbreviated data object and transmitting the map are performed regardless of whether the analyzing operation has completed for all subparts of the new data object.

7. The method of claim 5, where:

the operations further include responsive to receiving the new data object, making a corresponding entry in a queue;

the transmission operation comprises sequentially processing entries in the queue by, for each entry, transmitting the corresponding abbreviated data object and map, and then advancing to a next entry.

8. A signal-bearing medium tangibly embodying a program of machine-readable instructions executable by a digital processing apparatus to perform a method for transmitting data from a first computing site to second computing site, the method comprising the operations of:

at the first computing site, receiving a new data object comprising a new version of an existing data object already stored at the first computing site, the new and existing data objects each containing multiple subparts;

the first computing site comparing the new data object with the existing data object to identify any changed subparts of the new data object with respect to corresponding subparts of the existing data object;

the first computing site preparing a map indicating positions of the changed subparts within the new data object;

the first computing site preparing an abbreviated data object that includes the changed subparts and omits any unchanged subparts; and the first computing site transmitting the map and the abbreviated data object to the second computing site.

9. The medium of claim 8, the operations further comprising:
the second computing site receiving the map and the abbreviated data object, where the secondary computing site already contains a local copy of the existing data object;
the second computing site reconstructing the new data object by obtaining the changed subparts of the new data object from the abbreviated data object, obtaining unchanged subparts of the new data object from the local copy, and combining the obtained subparts.

10. The medium of claim 8, where the map is a bit map including bits equal in number to the prescribed number.

11. The medium of claim 8, the operations further comprising applying a compression process to the abbreviated data object prior to the transmitting operation.

12. A signal-bearing medium tangibly embodying a program of machine-readable instructions executable by a digital processing apparatus to perform a method for transmitting data from a first storage facility to second storage facility, the method comprising the operations of:
at the first storage facility, receiving a new data object comprising a new version of an existing data object already stored at the first storage facility, each data object containing multiple subparts;
initializing a map to indicate all subparts within the new data object as being different than corresponding subparts of the existing data object;
analyzing the new data object, comprising operations of:
comparing a subpart of the new data object to a corresponding subpart of the existing data object to determine whether the subparts differ, and only if the subparts do not differ, updating the map to indicate the subpart as being unchanged from the corresponding subpart of the existing data object;
repeating the comparing step for each subpart of the new data object;
preparing an abbreviated data object that includes the different subparts of the new data object while omitting subparts that do not differ as between the new and existing data objects; and
transmitting the map and the abbreviated data object from the first storage facility to the second storage facility.

13. The medium of claim 12, where the operations of preparing the abbreviated data object and transmitting the map are performed regardless of whether the analyzing operation has completed for all subparts of the new data object.

14. The medium of claim 13, where:
the operations further include responsive to receiving the new data object, making a corresponding entry in a queue;
the transmission operation comprises sequentially processing entries in the queue by, for each entry, transmitting the corresponding abbreviated data object and map, and then advancing to a next entry.

15. A logic circuit of multiple interconnected electrically conductive elements configured to perform operations for transmitting data from a first computing site to second computing site, the operations comprising:
at the first computing site, receiving a new data object comprising a new version of an existing data object already stored at the first computing site, the new and existing data objects each containing multiple subparts;
the first computing site comparing the new data object with the existing data object to identify any changed subparts of the new data object with respect to corresponding subparts of the existing data object;
the first computing site preparing a map indicating positions of the changed subparts within the new data object;
the first computing site preparing an abbreviated data object that includes the changed subparts and omits any unchanged subparts; and
the first computing site transmitting the map and the abbreviated data object to the second computing site.

16. A logic circuit of multiple interconnected electrically conductive elements configured to perform operations for transmitting data from a first storage facility to a second storage facility, the operations comprising:
at the first storage facility, receiving a new data object comprising a new version of an existing data object already stored at the first storage facility, each data object containing multiple subparts;
initializing a map to indicate all subparts within the new data object as being different than corresponding subparts of the existing data object;
analyzing the new data object, comprising operations of:
comparing a subpart of the new data object to a corresponding subpart of the existing data object to determine whether the subparts differ, and only if the subparts do not differ, updating the map to indicate the subpart as being unchanged from the corresponding subpart of the existing data object;
repeating the comparing step for each subpart of the new data object;
preparing an abbreviated data object that includes the different subparts of the new data object while omitting subparts that do not differ as between the new and existing data objects; and
transmitting the map and the abbreviated data object from the first storage facility to the second storage facility.

17. A data storage and exchange system, comprising:
an input/output (I/O);
a storage; and
a controller, coupled to the I/O and storage, and configured to transmit data to a receiving computing site by performing operations comprising:
receiving a new data object comprising a new version of an existing data object already contained in the storage, the new and existing data objects each containing multiple subparts;
comparing the new data object with the existing data object to identify any changed subparts of the new data object with respect to corresponding subparts of the existing data object;
preparing a map indicating positions of the changed subparts within the new data object;
preparing an abbreviated data object that includes the changed subparts and omits any unchanged subparts; and
transmitting the map and the abbreviated data object to the receiving computing site.

18. The system of claim 17, where:
the I/O, storage, controller, and form a transmitting computing site; and
the data storage and exchange system further includes the receiving computing site, comprising:
a second input/output (I/O);

a second storage; and a second controller, coupled to the second I/O and second storage, and configured to receive and process abbreviated data objects data from the transmitting computing site by performing operations comprising:

receiving the map and the abbreviated data object, where the receiving computing site already contains a local copy of the existing data object;

reconstructing the new data object by obtaining the changed subparts of the new data object from the abbreviated data object, obtaining unchanged subparts of the new data object from the local copy, and combining the obtained subparts.

19. The system of claim 16, where the map is a bit map including bits equal in number to the prescribed number.

20. The system of claim 17, the operations further comprising applying a compression process to the abbreviated data object prior to the transmitting operation.

21. A data storage facility, comprising:

an input/output (I/O);

a storage; and a controller, coupled to the I/O and storage, and configured to transmit data to a second data storage facility by performing operations comprising:

receiving a new data object comprising a new version of an existing data object already contained in the storage, each data object containing multiple subparts;

initializing a map to indicate all subparts within the new data object as being different than corresponding subparts of the existing data object;

analyzing the new data object, comprising operations of:

comparing a subpart of the new data object to a corresponding subpart of the existing data object to determine whether the subparts differ, and only if the subparts do not differ, updating the map to indicate the subpart as being unchanged from the existing data object;

repeating the comparing step for each subpart of the new data object;

preparing an abbreviated data object that includes the different subparts of the new data object while omitting subparts that do not differ as between the new and existing data objects; and     transmitting the map and the abbreviated data object to the second storage facility.

22. The facility of claim 21, where the operations of preparing the abbreviated data object and transmitting the map are performed regardless of whether the analyzing operation has completed for all subparts of the new data object.

23. The facility of claim 21, where:

the operations further include responsive to receiving the new data object, making a corresponding entry in a queue;

the transmission operation comprises sequentially processing entries in the queue by, for each entry, transmitting the corresponding abbreviated data object and map, and then advancing to a next entry.

* * * * *

UNITED STATES PATENT AND TRADEMARK OFFICE
CERTIFICATE OF CORRECTION

PATENT NO. : 6,490,596 B1 Page 1 of 1
DATED : December 3, 2002
INVENTOR(S) : William Frank Micka It is certified that error appears in the above-identified patent and that said Letters Patent is hereby corrected as shown below:

Column 9,
Line 42, insert -- a -- between "to" and "second computing site".
Line 50, delete the comma "," after "data object" and replace with a semi-colon -- ; --.

Column 10,
Line 51, insert -- a -- between "to" and "second computing".

Column 11,
Line 22, insert -- a -- between "to" and "second storage".
Line 62, insert -- a -- between "to" and "second".

Column 12,
Line 63, insert -- and -- between "storage," and "controller".
Line 63, delete ", and" between "controller" and "form a".

Column 13,
Line 4, delete "data" between "data objects" and "from the".
Line 15, delete "claim 16" and replace with -- claim 17 --.

Signed and Sealed this

First Day of July, 2003

JAMES E. ROGAN
*Director of the United States Patent and Trademark Office*